US006093504A

United States Patent [19]

Bliesner

[11] Patent Number: 6,093,504

[45] Date of Patent: Jul. 25, 2000

[54] ELECTRO-CHEMICAL-THERMAL RECHARGEABLE ENERGY STORAGE CELL (ECT CELL)

[76] Inventor: Wayne Thomas Bliesner, 22521 138 Ave. SE., Snohomish, Wash. 98296

[21] Appl. No.: 08/977,385

[22] Filed: Nov. 24, 1997

Related U.S. Application Data

[60] Provisional application No. 60/032,283, Dec. 3, 1996.

[51] Int. Cl.[7] .......... H01M 6/20

[52] U.S. Cl. .......... 429/103

[58] Field of Search .......... 204/241, 242, 204/243.1, 254, 255, 268, 269; 429/103, 104; 136/201

[56] References Cited

U.S. PATENT DOCUMENTS

| | | | |
|---|---|---|---|
| 3,468,786 | 9/1969 | Day | 204/243 |
| 3,649,480 | 3/1972 | Johnson | 204/67 |
| 3,674,567 | 7/1972 | Bradley et al. | 204/129 |
| 3,994,745 | 11/1976 | Ludwig | 429/81 |
| 4,011,148 | 3/1977 | Goudal | 136/201 |
| 4,269,907 | 5/1981 | Momyer et al. | 429/149 |
| 4,284,838 | 8/1981 | Indech | 136/202 |
| 4,287,045 | 9/1981 | Lechevaillier et al. | 204/243 R |
| 4,421,833 | 12/1983 | Zayatz et al. | 429/149 |
| 4,546,056 | 10/1985 | Jessen et al. | 429/149 |
| 4,755,350 | 7/1988 | Kennel | 136/202 |
| 4,833,046 | 5/1989 | Roy | 429/103 |
| 5,039,351 | 8/1991 | Cooper et al. | 136/200 |
| 5,225,295 | 7/1993 | Lim et al. | 429/149 |

*Primary Examiner*—Kathryn Gorgos
*Assistant Examiner*—Thomas H. Parsons
*Attorney, Agent, or Firm*—Dowrey & Associates

[57] ABSTRACT

A rechargeable energy cell providing a thermal energy output during discharge, and which recharges electrically. The cell contains chemical reactants and reactant product. The reactants are controllably combined in a reaction portion of the cell to produce the reactant product and the thermal energy output. In the preferred embodiment, the reaction portion is designed to facilitate heat transfer. The reactant product is electrolyzed into the reactants, which are separated and stored in the cell, by at least one electrode in operational communication with the reactant product. The electrode has a hollow internal cavity, and a portion of the electrode functions as a valve to convey one of the reactants electrolyzed by the electrode into the cavity without conveying the reactant product into the cavity. The system is fully reversible and results in energy densities which are over 1 kilowatt-hour per Kilogram of cell weight. The cell is also capable of extremely high specific power rates of over 2 kilowatts per Kilogram.

19 Claims, 3 Drawing Sheets

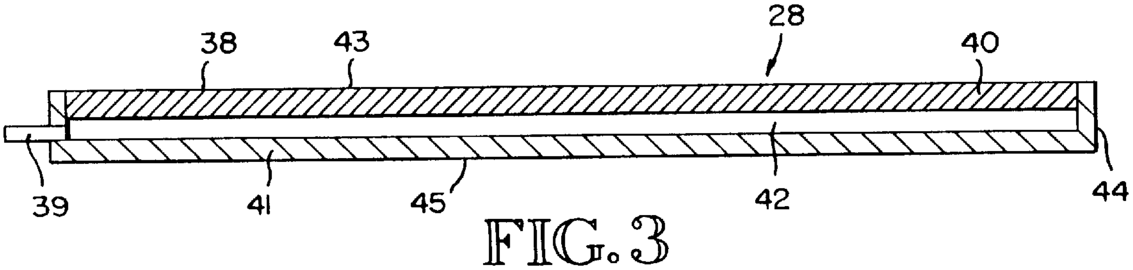
FIG. 3
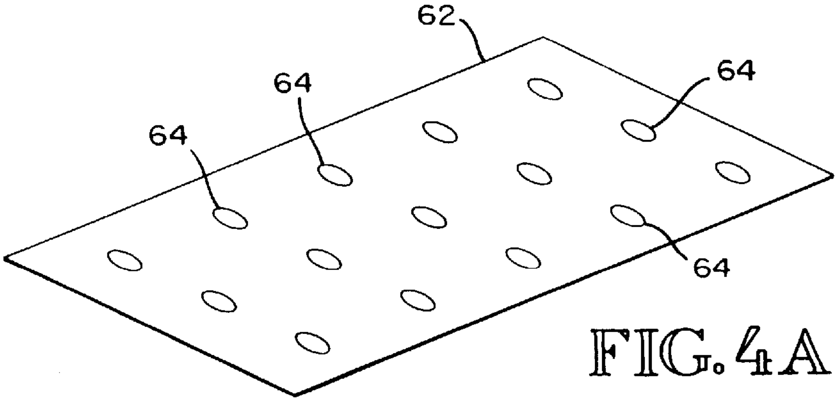
FIG. 4A
FIG. 4B
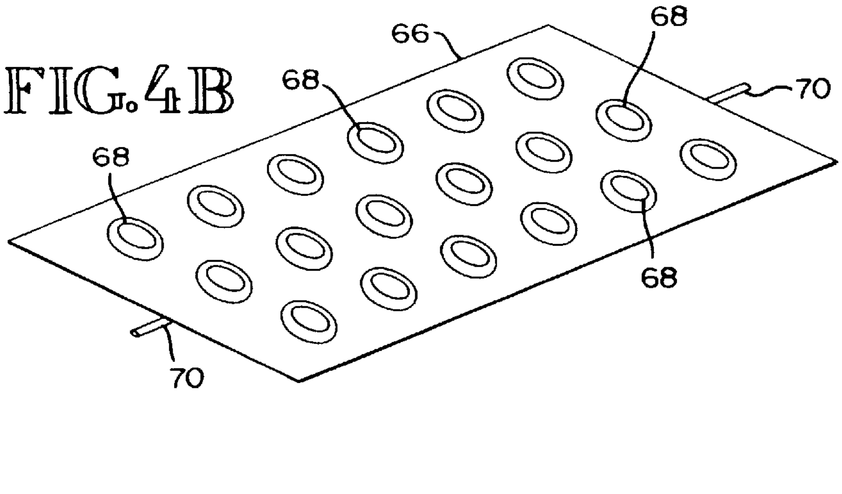

ELECTRO-CHEMICAL-THERMAL RECHARGEABLE ENERGY STORAGE CELL (ECT CELL)

CROSS REFERENCES TO RELATED APPLICATION

The ECT cell was designed to operate with the Stirling engine defined in the provisional patent 60/032,283 filed Dec. 3, 1996.

BACKGROUND OF THE INVENTION

1. Field of the Invention

This invention relates to rechargeable stored energy systems, specifically to:

1 Improvements in specific energy density for a reversible cell.

2 Improvements in specific power density delivered from a reversible cell.

3 Improvements in cell cost for a given energy density.

2. Description of the Related Art

A detailed patent search was carried out covering over 500 individual patent searches including cross references. The research found electrically charged battery systems with electrical output. Their was no mention of an electrically rechargeable system with a thermal discharge output in combination.

Search catagories included: 429.149, 136.200, 136.202, 429, 429.17, 204.248, 429.19, 429.247, 136.224, 320, 431.80, 432.30, 429.12, 136.203.

The systems were either pure electric, ie. charge and discharge, or pure thermal. There was mention of systems which started with heat and converted it to electricity.

BRIEF SUMMARY OF THE INVENTION

Accordingly, several objects and advantages of my invention are:

The Electro-Chemical-Thermal cell provides a unique combination of electrical charging with a thermal discharge. The system is a fully reversible closed system. The advantages of this configuration are significant. The current design shows a specific energy density which is almost 10 times larger than the most advanced reversible batteries in existence. These include: Lithium Ion, Nickel Metal Hydride, and Sodium Sulphur. The cell also has a specific power density which is over 10 times larger than the above mentioned advanced electric batteries. A further advantage is a significantly lower cost for the ECT cell relative to all of the advanced cells. Projected costs, for equivalent battery quantities, are less than 50% of the cost of the advanced electric batteries.

The ECT cell is a single cell for a given power application. This has advantages in simplicity, cost, and reliability. The ECT cell charges with a set of electrodes connected in series to minimise current losses. A unique charging configuration allows the working fluids to be separated into separate reservoirs for improved safety. The system design also allows over 95% of the energy to be stored in chemical form. This allows an almost unlimited storage life.

The ECT cell stores the oxidisers in a combined form for added safety. A compound is formed between Iodine and Chlorine which is a solid at room temperature. This feature adds significantly to the safety by preventing oxidiser loss in the case of a cell opening.

The fuel, Sodium, is alloyed with Calcium which has a dual benefit. The first is to allow an increased safety in the event of a spill. The Calcium coats the Sodium and lowers the fire hazard. The second benefit of the Calcium is in corrosion protection. The Calcium preferentially removes oxides from the ECT cell which increases the cell life.

BRIEF DESCRIPTION OF THE DRAWINGS

FIG. 3 is a detail cross-sectional view of one of the electrodes. The oxidiser is ducted out of the left side of the electrode and into the oxidiser outlet line shown in FIG. 2.

g) List of Reference Numerals

Figure 1:
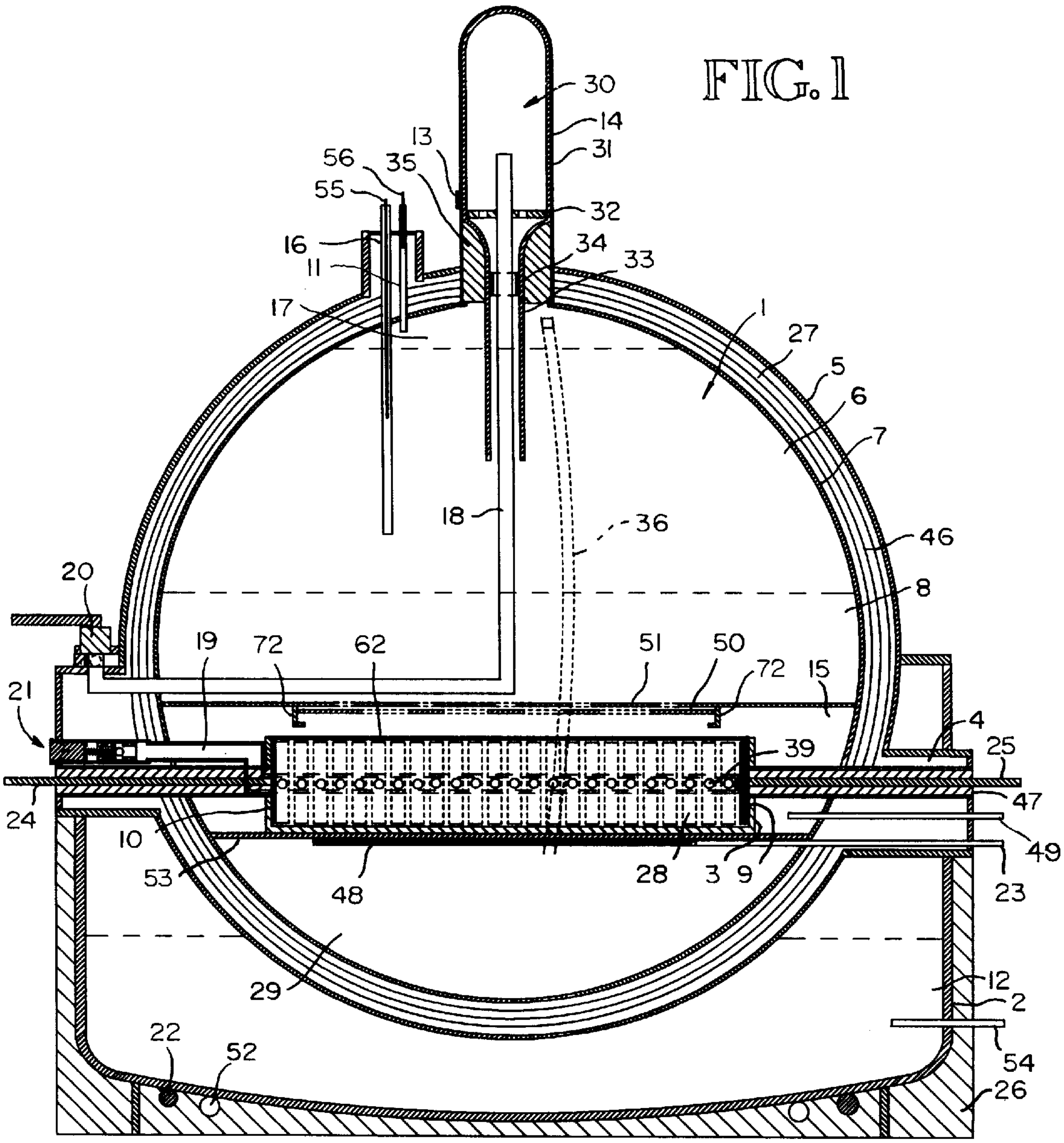
FIG. 1 shows a vertical cross sectional view of the complete battery system. The system includes the main cell, an oxidiser tank, two valves and connecting lines. Details of the electrode assembly and a typical electrode are shown in FIGS. 2 and 3 respectively. The main cell is surrounded by a thermal cover; a vacuum liner with a multi-foil reflective liner is shown in FIG. 1. Working fluid levels are shown by dashed lines in the two containers.

| Part Number | Part Name |
|---|---|
| 1 | Main Cell |
| 2 | Oxidizer Tank |
| 3 | Electrode Housing |
| 4 | Evacuated Coupling |
| 5 | Main Cell Outer Container |
| 6 | Sodium Region |
| 7 | Main Cell Inner Container |
| 8 | Sodium Chloride region |
| 9 | Right Molybdenum End Plate |
| 10 | Left Molybdenum End Plate |
| 11 | Vent and Pressure Probe Holder |
| 12 | Oxidizer |
| 13 | Reaction Chamber Temperature Probe |
| 14 | Heat Pipe |
| 15 | Salt Mixture |
| 16 | Fill Line and Temperature Probe Holder |
| 17 | Argon Gas Region |
| 18 | Oxidizer Input Line |
| 19 | Oxidiser Outlet Line |
| 20 | Oxidiser Flow Valve |
| 21 | Oxidiser Recharge Valve |
| 22 | Heater for Oxidizer Region |
| 23 | Heater Conduit |
| 24 | Left Electrode Feed Line |
| 25 | Right Electrode Feed Line |
| 26 | Oxidiser Tank Thermal Cover |
| 27 | Evacuated Region |
| 28 | Electrodes |
| 29 | Lower Argon Gas Region |
| 30 | Reaction Chamber |
| 31 | Liquid Sodium Wick |
| 32 | Wick Holder |
| 33 | Sodium Inlet and Sodium Chloride Outlet |
| 34 | Wick Spacer |
| 35 | Carbon Spacer |
| 36 | Argon Gas Line |
| 37 | Ceramic Spacers |
| 38 | Valve Electrode |
| 39 | Outlet |
| 40 | Porous Graphite |
| 41 | Dense Graphite |
| 42 | Slotted Cavity |

-continued g) List of Reference Numerals

| Part Number | Part Name |
|---|---|
| 43 | Ceramic Layer |
| 44 | Ceramic Coating |
| 45 | Conductive Coating |
| 46 | Reflective Foil |
| 47 | Ceramic Insulation |
| 48 | Salt Mixture Heater |
| 49 | Salt Mixture Temperature Probe |
| 50 | Insulator Float Plate |
| 51 | Sodium Chloride Holder Plate |
| 52 | Cooling System |
| 53 | Bottom Plate |
| 54 | Oxidiser Temperature Probe |
| 55 | Sodium Temperature Probe |
| 56 | Main Cell Pressure Probe |
| 57 | Argon Control Line |
| 58 | Valve Body |
| 59 | Adjustable Bolt |
| 60 | Spring |

BRIEF SUMMARY OF THE INVENTION

The electro-chemical-thermal cell is a unique combination which has significant advantages in terms of energy and power density over existing electrical or thermal storage cells. The system charges electrically storing the bulk of the energy in chemical form. This allows indefinite storage capabilities with full power on restart. The thermal output design focuses the heat into a small high temperature region. This provides the maximum efficiency to thermal power conversion systems such as Stirling, Brayton, or Rankine cycles.

The ECT cell is unique in the use of a salt control valve which maintains a local low temperature eutectic salt mixture around the electrodes. This allows higher energy densities in the cell by reducing the quantities of eutectic salts. The valve functions by regulating a dry powdered Sodium Chloride into the eutectic bath at a rate determined by the electrolysis of the Sodium Chloride in the eutectic bath.

The ECT cell is also unique in its ability to operate as a single cell independent of the number of electrodes used. A technique is used to electrically isolate each electrode within the salt bath so as to prevent shorting from the liquid metal formed during electrolysis.

The ECT cell is also unique in the use of a Boron Carbide ‘valve electrode’ layer made from a porous graphite starting material.

DETAILED DESCRIPTION OF THE INVENTION (The bold words in the text are shown as item names in the figures.)

General Arrangement

FIG. 1 shows the complete electro-chemical-thermal cell system in vertical cross section view. The ECT cell consists of a main cell(1) and an oxidiser tank(2). The main cell(1) contains both the charge and discharge sections of the cell. A reaction chamber(30) is located at the top of the main cell(1). A set of electrodes(28), for recharging, are located in the lower center of the main cell(1). All of the fuel, Sodium metal, is stored in the main cell(1) above the reacted salt in a Sodium region(6).

The main cell(1) contains a Sodium Chloride region(8) which is shown in the middle of the cell as a dry powder. The salt is a chemical compound consisting of a metal, preferably a light metal, and a non-metal, preferably a strong oxidiser. A quantity of metal is shown floating on the Sodium Chloride region(8) in the Sodium region(6). The level of the metal/salt interface depends on the level of charge in the system. An Argon gas region(17) is shown above the Sodium region(6). The interface between the metal and inert gas also moves up and down depending on the level of charge in the system. The lower region of the main cell(1) contains the set of electrodes(28) and a low melting point liquid salt mixture(15). The lower region has a Sodium Chloride Holder Plate(51) which separates the powdered Sodium Chloride Region(8) above the plate and the Sodium Chloride, Calcium Chloride, and Barium Chloride salt mixture(15) below the plate. An Insulator Float Plate(50) floats on the liquid salt mixture(15), during charging, and acts as a valve controlling the amount of Sodium Chloride allowed into the lower salt mixture.

In the charge cycle one of the oxidiser components, Chlorine, is separated from the salt during electrolysis and is ducted into the oxidiser tank(2) where it combines with the Iodine to form Iodine Chloride and Iodine TriChloride. An oxidiser recharge valve(21) is used to control the flow from the electrodes(28) to the oxidiser tank(2).

An oxidiser flow valve(20) is used to control the flow of oxidiser from the oxidiser tank(2) to the reaction chamber (30) during cell discharge.

The main cell(1) is surrounded by an evacuated thermal cover. The thermal cover is made of multilayer sheeting, such as a thin reflective foil(46), spaced inside an evacuated region(27).

The Main Cell

The main cell(1) is shown, in FIG. 1, with a 430 Stainless Steel shell for a main cell inner container(7) surrounding the working fluids. The container is coated on the inside with an electrically insulating ceramic which is also non-wetting and chemically inert relative to the salts and liquid metal. The ceramic coating consists of first a layer of Chromium Carbide applied over the Stainless surface then a layer of Boron Nitride. A Main Cell Outer Container(5) is also made from the 430 Stainless Steel. The outer shell is thicker to prevent buckling of the container due to the pressure differential caused by the vacuum. The outer container(5) has a set of evacuated couplings(4) located where tubes or electrodes connect across the inner and outer container wall. The extensions reduce the conduction losses for each coupling by providing a longer connector path inside the evacuated region(27).

An electrode housing(3) is a structural container which holds the electrodes(28) in place. The electrode housing(3) is also made of 430 Stainless and is coated both inside and outside with Chromium Carbide and Boron Nitride. The electrodes(28) are fitted between the electrode housing(3) walls and held in place with a set of ceramic spacers(37) shown in FIG. 2.

A left electrode feed line(24), shown in FIG. 1, is attached to a left Molybdenum end plate(10). A right electrode feed line(25) is attached to a right Molybdenum end plate(9). The current design uses Molybdenum for the two electrode feed lines(24 and 25) due to its corrosion compatibility with the working fluids. The two electrode feed lines(24 and 25) are insulated from each other, inside of the main cell(1), by a ceramic insulation(47). The Molybdenum end plates(9,10) are attached so as to provide an electrically conducting current path through the electrodes(28) and the salt mixture (15).

Referring also to FIG. 4A, the electrode housing(3) has a set of tailored holes(64) located in the top(62) of the housing which allow the liquid Sodium to float up out of the box through the liquid salt mixture(15). The tailored holes(64) allow the Sodium to escape from each electrode(28) as individual droplets which rise through the liquid salt mixture (15) preventing electrical shorting between electrodes(28).

Referring to FIG. 4B, in an alternate embodiment, electrode housing(3) has a moveable cover(66) located above the electrodes. Cover(66) has a set of individual pockets(68) one above each electrode, which allow the liquid metal to collect and be electrically isolated after leaving the electrodes. The cover (66) is hinged so that after a quantity of liquid metal has collected in the individual pockets(68), the buoyancy forces cause the cover(66) to pivotally rotate upwards about pivot (70), thereby releasing the metal accumulated in the pockets(68). Preferably, the cover(66) is electrically connected with the electrodes so that the electrodes are energized when the cover(66) is down, and when the cover rotates upward, the electric circuit is interrupted to deenergize the electrodes until it rotates back down into position.

The electrodes(28) have an oxidizer outlet(39) which connect the electrodes(28) to an oxidiser outlet line(19). The oxidiser outlet line(19) is connected to the oxidiser tank through the oxidiser recharge valve(21).

The main cell(1) has the reaction chamber(30) located at the center region. The reaction chamber(30) is constructed of 430 Stainless and is coated with the Chromium Carbide and Boron Nitride. A heat pipe(14) is located outside of the reaction chamber(30) and transmits the generated heat. The heat pipe(14) is connected to a heat engine such as a Stirling or Brayton engine, not shown. The heat engines can be heated directly from the heat pipe(14) or a secondary heat conduit can be used to move the heat from the heat pipe(14) to the heat engine. An oxidiser input line(18) is connected from the bottom of the reaction chamber(30) to the oxidiser flow valve(20). The bottom of the reaction chamber(30) has a Sodium inlet and Sodium Chloride outlet(33) which allows the various working material to enter and leave. The Sodium inlet and Sodium Chloride outlet(33) consists of a carbon spacer(35) which is connected to the reaction chamber(30). The outlet also has a liquid Sodium wick(31) which starts in the Sodium region(6) and ends inside the reaction chamber (30). The outlet also has an wick spacer(34) which holds the Sodium wick(31) in position. The oxidiser input line(18) holds the inlet wick spacer in position. A wick holder(32) holds the Sodium wick(31) against the reaction chamber(30) walls. A reaction chamber temperature probe(13) is used to measure the reaction chamber(30) temperature during operation.

A fill line and temperature probe holder(16) is located in the top of the main cell(1). A Sodium temperature probe(55) is used in the main cell(1) during operation. A vent and pressure probe holder(11) is located in the top of the main cell(1). A main cell pressure probe(56) is used in the main cell(1) during operation.

A lower Argon gas region(29) is located at the bottom of the main cell(1). The lower Argon gas region(29) is attached to the Argon gas region(17) by an Argon gas line(36). The lower Argon gas region(29) is enclosed by a bottom plate (53) from the rest of the main cell(1). A salt mixture heater(48) is located on the lower side of the bottom plate(53) inside of a heater conduit(23). The heater conduit (23) is a closed tube which connects through the right evacuated coupling(4).

A salt mixture temperature probe(49) is located in the right evacuated coupling(4). The probe is located inside of the main cell inner container(7).

Oxidiser Tank

The oxidiser tank(2), shown in FIG. 1, stores an oxidiser (12) separate from the main cell(1). The tank is constructed from Stainless materials and covered with Chromium Carbide and Boron Nitride. A heater for oxidiser region(22) is attached to the bottom of the oxidiser tank(2). An oxidiser tank thermal cover(26) surrounds the oxidiser tank(2). A cooling system(52) is also attached to the bottom of the oxidiser tank(2) and is used during recharge mode. The cooling system could use water as a heat transfer source.

The oxidiser recharge valve(21) is an automatic one way flow valve which allows flow from the main cell(1) into the oxidiser tank(2) during charging. An oxidiser temperature probe(54) is located inside of the oxidiser tank(2).

Electrode Assembly Detail

Figure 2:
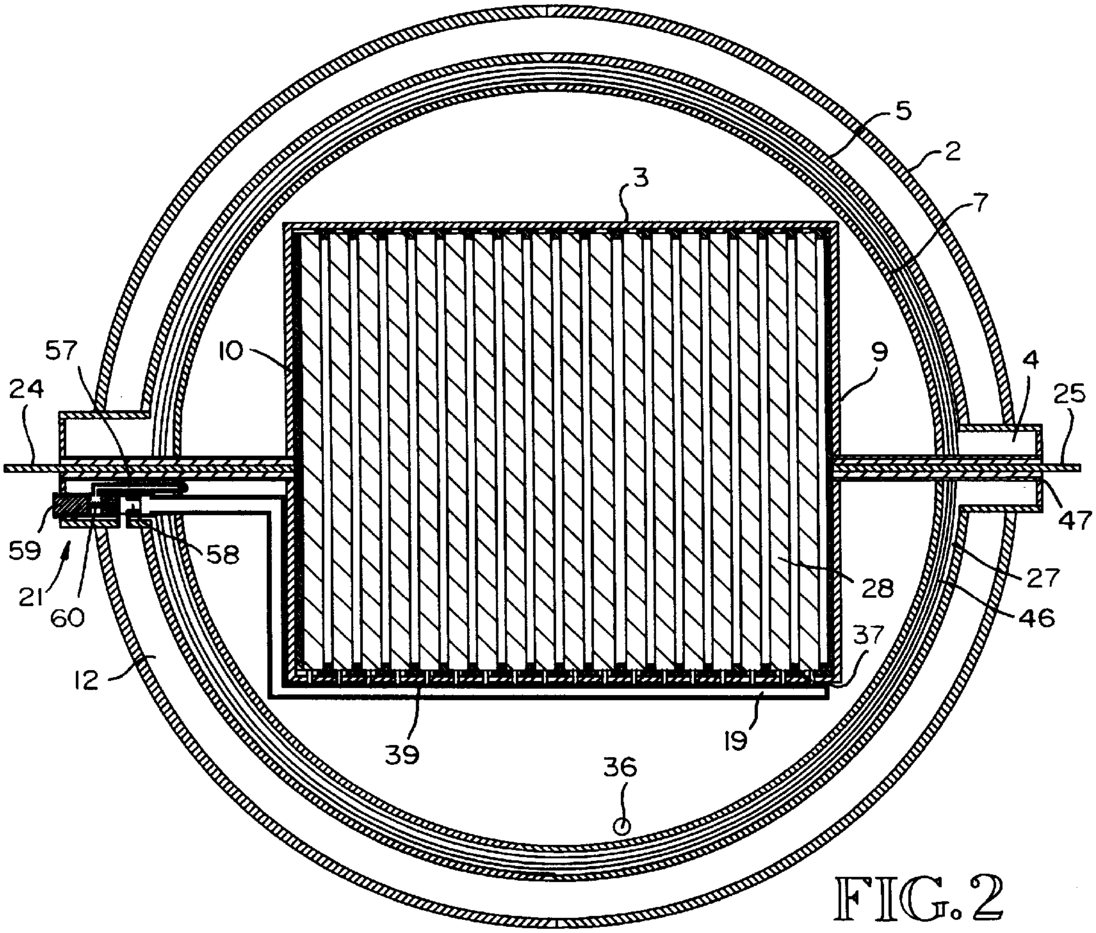
FIG. 2 is a horizontal cross sectional view of the electrode assembly which is used for charging the system. The electrode feed lines are shown emerging from the main cell. The top of the electrodes are shown in the middle of the electrode assembly. The electrode assembly includes an electrode housing surrounding all sides of the electrodes including the top. The ceramic spacers, shown in FIG. 2, are between each electrode.

Referring to FIG. 2, the electrode housing(3) is shown surrounding the graphite electrodes(28). The electrode housing(3) is constructed of 430 Stainless with a Chromium Carbide and Boron Nitride ceramic coating inside and out chemically and electrically isolating all of the components. The Molybdenum end plates(9,10) are attached to the electrode feed lines(24,25). The Molybdenum end plates(9,10) are covered with Hexagonal Boron Nitride on the sides which are exposed to the liquid salt. Ceramic spacers(37) are used to hold the spacing between the individual graphite electrodes(28). The oxidiser outlet(39) connects the individual graphite electrodes(28) to the oxidiser outlet line(19). The number of electrodes used is determined by the charging voltage requirements.

The oxidiser outlet line(19) is connected to the oxidiser recharge valve(21). The oxidiser recharge valve(21) is shown with an adjustable bolt(59) on the outside of the left evacuated coupling(4). The oxidiser recharge valve(21) has a spring(60) attached from the adjustable bolt(59) to valve body(58). The valve body(58) has four O rings located at either end of the cylindrical body. A set of vent holes are located between the mid two O rings and are connected to a central hole which runs out the right side of the cylindrical body. The oxidiser recharge valve(21) vents into the oxidiser tank through a side hole which runs from the oxidiser recharge valve(21) through the evacuated coupling(4). An Argon control line(57) is mounted to the oxidiser recharge valve(21) between the adjustable bolt(59) and the valve body(58). The Argon control line(57) is also attached to the Argon region below the bottom plate(53).

Electrode Detail

FIG. 3 is a top view of an individual graphite electrode (28). The graphite electrode(28) consists of a dense graphite (41) shell which is hollowed out and machined to have a slotted cavity(42) for the oxidiser flow. The slotted cavity (42) consist of a series of channels which run the length of the graphite electrode(28). The channels converge to the oxidiser outlet(39). A porous graphite(40) layer is fitted into the graphite electrode(28) and is coated with a ceramic layer to form the 'valve electrode'(38). A ceramic layer(43) consists of Boron Carbide which is created by infiltration of Boron atoms into the outer surface of the porous graphite (40) structure. The resulting Boron Carbide coating extends part way through the porous graphite(40) and has almost the same porosity as the original porous graphite(40). A coating of Turbostratic Boron Nitride is added over the Boron Carbide to increase the electrical resistance of the ceramic layer.

Operation

The Electro-Chemical-Thermal cell provides a significant increase in specific energy storage and specific power release rate relative to existing electrically charged/ discharged cells. This is due to the thermal output design which provides approximately 4 to 10 times the energy density of electrical discharge systems for equivalent reactants. The cell has the further benefit of not producing Carbon Dioxide during operation; which is known to contribute to global warming.

System Overview

The system charges using electrical input through a series of graphite electrodes(28). The molten salt is broken into its elements using electrolysis at each graphite electrode(28). One side of the graphite electrode(28) produces the constituent metal which floats to the top of the Sodium Chloride region(8). The other side of the graphite electrode(28) produces the oxidiser(12) which is internally ducted into the graphite electrode(28) and out of the main cell(1) into the oxidiser tank(2). When the main cell(1) is discharged a small quantity of liquid metal remains above the salt. The excess metal provides the preheat fuel required to heat the cell to a temperature which melts both the metal and the salt; prior to charging. An alternate heating method is to use the salt mixture heater(48). When the main cell(1) is charged a small amount of salt remains which covers the graphite electrodes (28) preventing them from electrically shorting. The use of thermal output allows the main cell(1) to be constructed as a single cell independent of size. This is due to the ability to separate the metal and oxidiser away from the graphite electrodes(28) after electrolysis.

Cell discharge occurs in the reaction chamber(30) where the output heat is generated. The reaction chamber(30) is isolated so that a high localised temperature can be maintained. The high temperature is necessary to provide an efficient operation of an external combustion engine; such as a Stirling, Brayton, or Rankine cycle engine. The external heat pipe(14) transfers the energy from the reaction chamber (30) to the engine with minimal losses. The heat transfer can be directly from the heat pipe(14) or through a heat conduit or thermosyphon located between the ECT cell and the engine. The rate of oxidiser addition to the reaction chamber (30) determines the heat flux available to the heat pipe(14). The heat output rate is significantly higher than an equivalent electrical output cell due to the ease of sizing the heat pipe(14) to significantly higher power rates.

System Charging

The system is ready for charging when the quantity of salt mixture(15) is liquefied in the main cell(1). The salt mixture temperature probe(49) measures the salt mixture temperature. The heating of the salt mixture can be accomplished electrically with the salt mixture heater(48) on the outside of the bottom plate(53). The two containers, the oxidiser tank (2) and the main cell(1), are insulated to minimise losses from the containers. The oxidiser tank(2) operates at temperatures which are significantly lower than the main cell(1). The lower temperature minimises the heat losses from the oxidiser tank(2) allowing a fiber type insulation shown as the oxidiser tank thermal cover(26). The main cell(1) contains the majority of the working fluids at a moderately high temperature. Since heat losses through the main cell outer container(5) are the largest direct efficiency loss it is beneficial to insulate this main cell outer container(5) using a multilayer foil vacuum container. This allows the main cell(1) to remain hot, with the metal and salt in a molten state, for several weeks without the need to preheat the system. The vacuum container consists of the main cell inner container(7) which holds the liquid metal and salts. The region between the inner and outer containers(5 and 7) contains the evacuated region(27). A multi-layer set of thin metal reflective foil(46) is used to improve the insulation.

Once the system is up to temperature a pressure differential is created between the main cell(1) and the oxidiser tank(2). The oxidiser tank(2) pressure is reduced by the amount tolerated by the 'valve electrode'. The pressure can be reduced in the oxidiser tank(2) by reducing the temperature of the oxidiser tank by using the cooling system(52). The oxidiser recharge valve(21) is set to the desired pressure difference between the main cell and the oxidiser tank, which is approximately 1 to 2 pounds per square inch pressure. Once the system starts charging the pressure differential will be maintained by the cooling rate of the oxidiser in the oxidiser tank(2). Oxidizer recharge Valve (21) is allowed to move oxidiser from the graphite electrodes(28) to the oxidiser tank(2).

Valve (21) is an automatic one-way oxidizer recharge valve which opens when the pressure in the main cell(1) is above the oxidiser tank(2) pressure. The oxidiser recharge valve(21) operates using the Argon pressure as a reference pressure source. The Argon control line(57) is located on one side of the valve body(58). The spring(60) is tied between the valve body(58) and the adjustable bolt(59). The spring (60) provides the pressure differential capability by applying a pulling force to the valve body(58). When the pressure differential is within 0 to 2 psi the valve body(58) allows oxidiser(12) flow from the electrodes(28) to the oxidiser tank(2). At higher and lower pressures the valve body(58) seats at left or right position and closes off the oxidiser flow.

The higher pressure forces the oxidiser into the oxidiser tank(2) where the cooling system(52) cools the mixture and lowers the vapor pressure. The main cell(1) is pressurised using a inert gas; such as Argon or Helium. The Argon gas region(17) is increased by the lower Argon gas region(29) which it connects to by the Argon gas line(36). This allows the main cell(1) to remain at approximately constant pressure during charging while the volume in the main cell(1) is changing. The total system Argon pressure can also be raised, by the vent(11), to allow more rapid charging rates.

The charging process uses the graphite electrodes(28) which are held by the electrode housing(3). The graphite electrodes(28) are set-up in series which allows an increase in the voltage used for input into the electrode feed lines (24,25). The feed lines are isolated from the main cell(1) using ceramic insulation(47). This allows the current to be less for a given wattage input. The two electrode feed lines(24,25) are connected to an outside direct current charging source. The electrode feed lines(24,25) supply power to the end electrodes through the Molybdenum end plates(9, 10) located outside of the two end electrodes. The Molybdenum end plates(9,10) are sealed from fluids to minimise corrosion and electrical leakage. The graphite electrodes(28) function by electrolysis of the salt which surrounds them. The current path is set-up to be the least resistance while passing through the graphite electrodes(28) series. This minimises losses from electrolysis occurring outside of the graphite electrodes(28) stack. Each graphite electrode(28) is designed so that on one side of the graphite electrode(28) the Sodium metal is formed and released. The metal floats up into the electrically isolated Sodium region(6). The electrode housing(3) has a top(64) which has a well defined set of holes(64) to allow a controlled rate of liquid Sodium to float up through the salt mixture(15) as a series of small droplets; each droplet electrically separate from the rest. The Sodium passes through the insulator float plate(50) where it is wicked up through the dry Sodium Chloride region(8) to the sodium region(6).

The oxidiser is formed on the opposite face of a given graphite electrode(28) and is ducted inside of the graphite electrode(28) through the “valve electrode”(38). The oxidiser moves through a small electrode Chlorine outlet(39) located at the end of the graphite electrode(28) into the oxidiser outlet line(19). The oxidiser then travels through oxidizer recharge valve (21) and into the oxidiser tank(2). Upon entering the oxidiser tank(2) the oxidiser is cooled to ambient temperature conditions. The Chlorine mixes with the Iodine and Iodine Chloride to form Iodine TriChloride and Iodine Chloride. Both of these compounds are extremely stable and form a liquid in the oxidiser tank(2).

The electrode(28), in FIG. 3, has dense graphite (41) on five of the six sides. The ‘valve electrode’ side has a porous graphite(40). The ceramic coating(44) electrically insulates the electrode. The conductive coating(45), consisting of Chromium Carbide, increases the conductivity and wetting on the electrode face. The ceramic layer(43) provides the wetting surface for the ‘valve electrode’ to function.

The oxidiser side of the graphite electrode(28) functions using a ‘valve electrode’ technique. The ‘valve electrode’ (38) is designed to prevent the salt from migrating past the porous graphite(40) and ceramic layer(43) interface. This is accomplished using surface tension forces which allow a pressure differential between the main cell(1) and the oxidiser tank(2) without the salt moving across the barrier. The ‘valve electrode’(38) works by having a porous, conducting, nonwetting medium located inside the electrode near the oxidiser face. Graphite is chosen for this material. A porous, nonconducting, wetting layer of material is covering the porous Graphite. The salt wets the nonconducting material and forms the interface where the electrolysis occurs for the oxidiser. The size of the maximum pressure differential which the interface can support is related to the viscosity of the salt and the pore size of the interface. A small pore size is beneficial for supporting larger pressures between the main cell(1) and the oxidiser tank(2).

The salt mixture(15) is chosen to be a low melting point salt mixture. Calcium Chloride and Barium Chloride are mixed with the Sodium Chloride to lower the melting point. The liquid salt is required for the electrodes to function. The two added salts were also chosen due their ability to remain compounds during the electrolysis so that only Sodium is formed.

As the Sodium Chloride is used up in the electrolysis reaction at the electrodes(28) the insulator float plate(50) slowly settles and allows dry Sodium Chloride powder to replace the Sodium Chloride which was separated out. The Sodium Chloride flows through holes in the Sodium Chloride holder plate(51). A path through the holder plate and float plate is formed when the float plate settles slightly. The insulator float plate(50) is shown constrained by limiters(72) to move only a small amount.

The electrolysis process can continue until all of the Sodium Chloride has been separated into its components. When the powdered Sodium Chloride region(8) is used up the quantity of Sodium Chloride in the salt mixture(15) will drop. The melting point of the salt mixture(15) will slowly rise as the Sodium Chloride is removed. The salt mixture (15) will then solidify around the electrodes(28) and stop the electrolysis from proceeding further. This offers a fail-safe technique in case the electrical circuit is not turned off. What should happen under normal operation is the current will drop and a charging circuit will detect the drop-off and stop the charging completely.

System Discharging

The main cell(1) can be stored almost indefinitely with the temperature of all the components at ambient conditions. For cell start-up the salt mixture heater(48) is activated and allows heatup to 120 degrees Centigrade in the main cell(1). The heater conduit(23) holds the heater(48) and seals it from the rest of the cell. The ECT battery uses thermal discharge to obtain very high energy density and discharge rates. The ECT battery is designed for very rapid start-up once the Sodium is in the liquid state. The main cell(1) can be fully operational with the temperature in the main cell(1) above 120 Centigrade. The main cell(1) temperature and pressure are measured using the probes(55 and 56). The probes are located inside the vent and fill lines(11 and 16).

The oxidiser tank(2) is heated using the heater(22) to bring the oxidiser to a slightly higher pressure relative to the main cell pressure. The oxidiser temperature is measured using the probe(54). Once the system is up to temperature the oxidizer flow valve(20) can be used to control the heat output through the reaction chamber(30).

The use of a small reaction chamber allows faster start-up rates and provides a locally hotter reaction chamber(30) temperature which can be transferred to the external combustion engine for higher efficiency. The temperature in the reaction chamber(30) is monitored using the temperature probe(13). The probe can be tied to a feedback system with the oxidizer flow valve(20) so that the desired temperature in the reaction chamber(30) can be maintained. The Sodium enters the reaction chamber(30) using a wicking action in a Stainless mesh Sodium wick(31) which runs from the liquid Sodium region(6) up inside the heat pipe(14). The wick holder(32) and the wick spacer(34) help hold the wick in position inside the reaction chamber(30).

The carbon spacer(35) is used to help insulate the reaction chamber(30) and to improve the heat transfer between the liquid salt and the incoming reactants. The reaction chamber (30) has a region, the Sodium inlet and Sodium Chloride outlet(33), where the liquid metal and oxidiser input line(18) are ducted past the outflowing salt. The salt is moving in the opposite direction as the metal and oxidiser and transfers the higher temperature heat from the salt into the metal and oxidiser preheating them prior to entering the reaction chamber(30).

The main cell(1) is surrounded by a multilayer foil evacuated region which minimises the heat loss from the main cell(1). The connecting fittings to the main cell(1) are also insulated so that the main cell(1) can remain liquid for several days without operation. The evacuated coupling(4) reduces the losses at the fittings. If it is desired to maintain the main cell(1) at operating temperature then a small supply of oxidiser can be added to the oxidiser input line(18) using a temperature feedback system to monitor flow rates.

Alternative Embodiments

The Electro-chemical-thermal cell can operate with a wide number of variations in its components. The only features which are specific to the cell are:

1) The use of electricity and/or thermal energy to reverse the process and effectively recharge the ECT cell.

2) The storage of energy mainly in the form of a chemical change. A combination of chemical and thermal storage is also available.

3) The output is mainly thermal. Electrical output could be produced by wicking the liquid metal down to, each/or some, of the electrode faces. The output could then allow combinations of thermal and electrical energy such as; 1) thermal only, 2) thermal and electrical, or 3) electrical only.

Main Cell (1)

The general arrangement can vary considerably over what is currently shown in FIG. 1:

It is possible to have the liquid metal heavier than the salt in which case the electrodes would be on top; also the liquid metal feed line would be reversed and connected to the lower metal region.

It would be possible to store the liquid metal in a separate container. The metal could be wicked into individual containers; one for each electrode.

It would also be possible to move the reaction chamber out of the main cell. Feed lines to the reaction chamber would be required and a salt drain to move the salt to the main cell once the metal and oxidiser have reacted.

It may be possible to use a metal and oxidiser which can both be stored in the main cell. For instance if both, metal and oxidiser, were liquids at the operating temperatures then one could be heavier and one could be lighter than the salt. This would allow the salt to keep the two reactants apart. With this system the separate oxidiser tank (2) would not be required.

It may be possible to use preferential wicking regions to separate the salt and liquid metal. By wicking the liquid metal away from the electrodes in may be possible to make the main cell orientation independent or even gravity independent; i.e. zero gravity.

The main cell could also be put in some type of cradle arrangement where it would orient itself with gravity and the outer container could move independently.

The main cell could be made into any shape required. For instance it could be taller or wider in any direction. It could also be tapered in any direction to meet requirements.

Another arrangement of the main cell is to spin the cell about an axis. Centrifugal force could be used to separate components.

The main cell and/or oxidiser tank could be made of Carbon/Carbon or Boron Nitride/Boron Nitride. The ceramic liner, in the main cell, could be any individual layer or combination layers of Boron carbide, Cubic Boron Nitride, Turbostratic Boron Nitride, Chromium Carbide, and Hexagonal Boron Nitride.

Oxidiser Tank (2)

The tank can be changed in size and shape to meet requirements. For instance it can be round or cylindrical with flat or rounded ends. The tank can be made of a variety of materials; including metals, ceramics, composites. Liners or coatings can also be applied to the tank to prevent corrosion; multiple layers or single layers can be used. The oxidiser tank can be placed in any orientation relative to the main cell. It can be above, below or next to the main cell.

The use of a binary, or higher multiple, oxidiser for the ECT system is unique; i.e. Iodine and Chlorine. Using two components which combine to form a third compound allows an improvement in system safety and can ease storage. For instance two substances combining to create a liquid or solid stores at lower pressure and with possibly a smaller tank size. Other oxidisers which could be considered include: 1) Fluorine and Chlorine, 2) Fluorine and Iodine, 3) Fluorine and Bromine, 4) Fluorine and Sulphur, 5) Chlorine and Sulphur, 6) Chlorine and Bromine, 7) Fluorine and Oxygen, 8) Hydrogen and Chlorine, 9) Hydrogen and Fluorine, 10) Phosphorus and Chlorine, 11) Phosphorus and Bromine, 12) Phosphorus and Fluorine, 13) Arsenic and Chlorine, 14) Arsenic and Bromine, 15) Chlorine and Iodine, or 16) Tin and Chlorine. Single oxidiser substances could include: Sulphur, Selenium, Tellurium, Tin, Arsenic, Antimony, Chlorine, Fluorine, Iodine or Bromine.

Electrode Housing(3)

The electrode housing consists of a box for holding the electrodes and conduits for bringing the oxidiser and electrode feed lines out of the main cell. The oxidiser outlet line(19) can be attached to any part of the electrode housing and can project through the main cell in any orientation.

The electrode housing can be curved or fabricated in any shape as long as it serves to hold the electrodes. Multiple housings could be used with batches of electrodes.

The oxidiser outlet line(19) can be used for charging where the oxidiser flows away from the electrodes or it can used for discharging (producing electricity) where the oxidiser flows toward the electrodes.

The electrode housing could be eliminated if the electrodes were mounted directly in the main cell with electrode end holders mounted on the main cell walls. Spacers could also be used to hold the electrodes in place inside of the main cell. The end electrodes could be mounted directly in the main cell wall. This could keep the electrode feed lines(24, 25) completely outside of the main cell. The electrode feed lines(24,25) could be made retractable and touch the electrode end plates only when required for charging. This would reduce the thermal conduction path. One possibility is to have the electrode feed lines(24,25) change shape from heating to a certain temperature, or from an external electrical input. The use of a bi-metallic strip, for the electrode feed lines(24,25), could expand differentially with temperature and touch only at the charging temperature.

The oxidiser outlets (39) could be designed to pass though the main cell wall and connect with a common oxidiser outlet or mixing chamber on the main cell outer wall.

The oxidiser lines, (18,19), could be combined into a single line. Temperature sensitive or 1 way valves could be used to direct the flow inside of the main cell. For instance the oxidiser flow could be designed to only flow away from the electrodes when the main cell pressure is higher than the oxidiser tank. If the main cell is hotter for charging, possibly to melt the salt, then a thermal expansion type valve could be used to block flow to the reaction chamber(30). For start-up, an automatic expansion type valve could be closed in the oxidiser input line(18) when the main cell temperature is too low and open once it reached a certain temperature.

A cooling system could be required for system operation to maintain a given temperature. Cooling lines could be put into the main cell(1).

A system similar to the bimetal power bus could be used for cooling. If the temperature exceeded a certain amount the metal strip would touch the outside of the main cell(1) and significantly increase the heat transfer rate through the metal strip.

The electrode housing(3) could be fabricated from a number of materials. Different types of conducting and/or nonconducting fibers could be used. Metal conduits could be used for the oxidiser if corrosion did not occur. Combinations of metal and ceramic could be used to minimise heat loss. The baseline design uses a metal structure but a carbon/carbon or Boron Nitride/Boron Nitride structure which is coated with a nonconducting and nonwetting layer could also be used. Hexagonal Boron Nitride can serve as the coating. Additions of Boron Carbide and Cubic Boron Nitride, as base layers, may add to the life of the coating.

Evacuated Coupling (4)

The main cell system could be designed with or without any of the couplings. The couplings could have multiple layers of foil inside to aid heat loss. The couplings could be any shape or size.

Main Cell Outer Container (5)

The container serves to keep the working fluids inside at operating conditions with minimal losses. The baseline design is to use a Stainless container. The container can be made from any fiber or metal or combination of both.

Fittings or openings are used to access the various hardware that go in and out of the main cell.

The container can be any shape or size depending on requirements.

Sodium Region (6)

The metal region can contain a porous felt or wicking material to keep the metal from splashing. Boron Nitride or carbon fibers would work for this purpose.

All metals and metal combinations could be used, for the system, as fuel. Some of these would include: Sodium, Calcium, Lithium, and Magnesium.

Main Cell Inner Container (7)

The inner walls are pressure formed into a mold afier heating to forming temperature. The container can be any shape to accommodate the battery requirements. The container can be metal or a combination of fibers and binders.

Sodium Chloride Region(8)

A porous felt material could be used to prevent sloshing. Boron nitride or carbon felt could be used for this purpose.

Molybdenum End Plates(9,10)

The end plates serve to spread the electrical current uniformly across the end electrodes. Other materials could be used besides the Molybdenum such as certain Stainless steels or conductive ceramics; such as Chromium Carbide. The end plate placed against the main cell container wall with a single electrode feed line(24,25) going through the wall on each end. Sealing would be required where the electrode feed line(24,25) goes through the main cell wall.

The end plates could be eliminated by using the electrode feed line(24,25) directly against the end electrodes. The electrode feed line(24,25) could be flattened to improve contact to the electrodes.

Vent and Pressure Probe Holder(11)

This probe is for monitoring cell performance. The probe could be tied into the control system or they could be removed once the complete system is operational.

Heat Pipe(14)

The heat pipe is sized based on the heat flow rate requirements. Other forms of heat transfer systems could be used including boilers and metallic conductors. Single or multiple pipes can be bundled together to form the heat transfer mechanism.

The heat pipe could be any shape or size. The current configuration shows a hollow tubular shape. A variation would have a central tube shape which is located inside the reaction chamber and which protrudes down from the top. The wick could be attached to this center region.

The heat pipe could enter the main cell(1) at any location.

The heat pipe could be welded or attached directly into the main cell(1).

Salt Mixture (15)

A number of salt combinations could be used for this region. The salts planned for use allow the Sodium Chloride to electrolyze first. Partial combinations of salt reactions could be beneficial. A single salt could also be used. Other types of mediums would work if they allowed a reduced temperature for electrolysis relative to the pure salt.

Fill Line and Temperature Holder(16)

The line could be made from Stainless Steel or other non reactive materials.

Argon Inert Gas Region(17)

The region can vary in size depending on quantities of salt and metal. The use of an inert gas with a low boiling point is ideal. Various gases could be used to equalize the pressure between the two containers. Argon, Nitrogen, or Helium should also work but the pressure is going to vary with the level of fluids and the initial charge pressure.

Oxidiser Input Line(18)

Hastaloy C should work for this pipe up to the reaction chamber. Other types of metallic alloys or alloy with internal coatings could be used. Chromium Carbide could be added to the metal surface. A carbon or graphite pipe should be used for the high temperature area. Hexagonal or Cubic Boron Nitride could be used as a sealer. Various Molybdenum alloys could also be used. Various Stainless alloys could also be used.

Oxidiser Outlet Line(19)

The line is sized for maximum flow requirements for charging. Chromium Carbide and/or, Hexagonal or Cubic Boron Nitride would work as a sealer. The line could be carbon or a Stainless material such as Hastaloy C or Molybdenum alloys.

Oxidiser Flow Valve(20)

The valve controls the oxidiser output for discharging. The valve can be manual or automated. It can be tied directly to temperature probe (13) for oxidiser flow rates. The valve can be Hastaloy C, Stainless Steel, or Carbon. Coatings with Hexagonal Boron Nitride can be used as a sealer. Varying types of Teflon coatings could also be used.

Oxidiser Recharge Valve(21)

This valve is set to prevent the pressure between the two tanks from exceeding a specified value. It also controls whether the oxidiser is moving in or out of the main cell. The valve can be Hastaloy C or Carbon. Coatings with Hexagonal Boron Nitride or Teflon can be used as a sealer. Other types of metal and/or ceramics can be used for the valve.

Heater for Oxidiser Region(22)

This heater controls the temperature and pressure of the oxidiser tank. Heating will be required for output and cooling required for charging. The pipe can be heated by the heat pipes from the reaction chamber.

A closed water loop can also be used for heating and cooling.

Electrical heating of the oxidiser tank with water cooling could be used.

Electrode Feed Lines(24,25)

The power rods can be made of any electrically conducting material. Molybdenum matches expansion with carbon. The rods are sized for maximum current flow on charging. The rods are sealed inside of the main cell to prevent corrosion and shorting to the main cell walls. Combinations of ceramic, Turbostratic, or Hexagonal Boron Nitride provide seals.

Thermal Cover(26)

Insulation around the oxidiser tank can be from a number of materials such as rigid or blanket silica insulation or an evacuated region. Leaving the insulation off may be possible based on flow rates.

Evacuated Region(27)

Thermal cover for the main cell could be rigid or blanket silica insulation. A multilayer reflective foil evacuated container is preferred for size and insulating benefits. Extended evacuated tubes may be used surrounding fittings. Single layer evacuated containers could also be used.

Graphite Electrodes(28)

The number of electrodes is based on charging voltage requirements and type of salt used. Electrodes can be flat or have faces which are shaped to maximise area. Shaping can also be used to maintain a uniform electrical field on the electrode face. The spacing between electrodes can vary depending on salts used and metal contamination to adjacent electrode. The shape and size will vary depending on requirements.

Reaction Chamber(30)

The reaction chamber is formed from 430 Stainless. Carbon/Carbon can also be used or Molybdenum alloys. The chamber can be rounded in any direction. The various heat pipes, inlets and drains can enter or leave the chamber from any side. Coatings can be applied such as Cubic Boron Nitride, turbostratic Boron Nitride, Hexagonal Boron Nitride, Chromium Carbide, and Boron Carbide. Combinations of these coatings can also be applied. A coating of Lithium Carbide can be used to protect the inner surface of the reaction chamber.

Wick Holder(32)

The holder could be any shape or size. The holder could be used to support various spots inside the reaction chamber.

Sodium Inlet and Sodium Chloride Outlet (33)

The opening can be located anywhere on the reaction chamber. The opening can be any number of sizes and quantity. The design is used to act as a heat exchanger between the outgoing hot fluids and the incoming cooler fluids.

Ceramic Spacers(37)

The spacers can be machined as separate pieces such as graphite or hexagonal Boron Nitride. If graphite is used the spacers should be coated with hexagonal Boron Nitride or a combination of boron ceramics including cubic Boron Nitride and Boron Carbide. The spacers could also be made from rigid silica board and coated with hexagonal Boron Nitride.

The spacers could be machined directly on the electrode housing(3). Ceramic coatings could be applied when the electrode housing(3) is coated with ceramics.

The spacers could be machined onto a separate rail. The rail could fit directly into the main cell(1). The rail and spacers could use any combination of ceramic coatings including: Boron Carbide, hexagonal Boron Nitride, or cubic Boron Nitride.

Valve Electrode(38)

The valve electrode can be made from any combination of a conducting and nonwetting substrate, relative to the salt, and a wetting and nonconducting outer layer. The baseline uses porous graphite as the substrate or inner layer. The coating can consist of combinations or individual layers of Boron Carbide, Cubic Boron Nitride, Magnesium Oxide, or Beryllium Oxide.

Oxidiser Outlet(39)

The outlet can be machined or manufactured as a separate piece or it can be made directly from the dense graphite(41) piece. Carbon/carbon tubing of any shape could be used. A machined piece of hexagonal Boron Nitride could also be used; with any desired shape. If a conducting material is used then an insulator, such as Boron Nitride is needed over the surface to prevent shorting to the electrode housing.

Porous Graphite(40)

The graphite can have any number of variations in porosity and pore size distribution. Any conductive porous material which is compatible with the oxidiser could be used for this application.

The basal plane in the graphite should be aligned with the current direction to minimise resistance.

A conductive paste could be applied between the porous graphite(40) and the dense graphite(41).

The porous graphite could be used for the whole electrode with coatings on various faces to prevent leakage. The oxidiser slots could be made by drilling at varying angles throughout the oxidiser outlet(39).

If the oxidiser is kept inside the main cell then a nonporous conductive material could be used.

Dense Graphite(41)

The dense graphite is used to keep the oxidiser from flowing though its surface. The graphite could be machined or made from a carbon/carbon piece which is baked to convert the material to graphite.

Slotted Cavity(42)

The cavity can be made from any type of material which is not affected by the oxidiser. The cavity could be machined directly into the dense graphite(41). The cavity could be machined from the porous graphite(40). The cavity could be made from a metal such as a Stainless alloy.

The cavity should be made with an even distribution of channels to duct the oxidiser from the porous graphite(40) to the oxidiser outlet(39). This distribution helps to maintain a uniform electric field through the electrode. If a prescribed electric field is beneficial, such as one which is located mainly in the center of the electrode, then the cavity could be machined around the inner rim of the electrode(28).

Ceramic Layer(43)

This layer is described in the section on the 'valve electrode' for an internally ducted oxidiser. If the oxidiser is kept inside of the main cell(1) then the surface layer would be conducting and wetting similar to the conductive coating (45). An oxidiser that could work for this could include Sulphur, Selenium, Arsenic, Antimony, Tin, or Tellurium which would sink in the main cell(1) after electrolysis. The salt would be used to separate the liquid metal and the oxidiser. For this arrangement the electrodes(28) would help keep the metal and oxidiser apart.

Ceramic Coating(44)

This coating is a nonwetting and nonconducting layer of ceramic. The material could use any combination of ceramic coatings including; but not limited to: Boron Carbide, hexagonal Boron Nitride, or cubic Boron Nitride.

Conductive Coating(45)

This coating provides a wetting and conducting layer for the electrode(28). Materials for this could include: Chromium Carbide or Titanium Carbide or other types of metallic carbides.

The coating could also be a Stainless or Molybdenum material which is applied directly to the electrode(28) or pressed onto the surface as a porous gauze of mesh.

Insulator Float Plate(50)

This plate is made from a nonconducting material which floats on the salt mixture layer. It should be heavier than the liquid metal with small holes across the surface to allow the Sodium to pass through. The hole pattern should also prevent the dry Sodium Chloride from moving into the region of the salt mixture (15) when the plate is near the Sodium Chloride the holder plate(51).

Sodium Chloride Holder Plate(51)

The plate can be fabricated from a metal or fiber material. The hole pattern is variable depending on design and salt flow rate requirements. The plate is anchored to either the main cell wall or the electrode housing.

General Modifications

Other ceramic materials could be used instead of the Boron ceramics. The computability of the metal and oxidiser could be used to determine which ceramic is appropriate.

Other metals or conducting or nonconducting ceramics, used as appropriate, could replace the carbon or graphite if they were compatible with the metal or oxidiser used.

Other metals or conducting ceramics can be used to replace the Molybdenum parts.

If the system is used as a heater where focusing the heat was not required; then the following parts could be eliminated: 14,30,31,32,33, and the coupling extension at the heat pipe region.

CONCLUSIONS, RAMIFICATIONS, AND SCOPE OF THE INVENTION

While the above description contains may specificity's these should not be construed as limitations on the scope of the invention, but rather as an exemplification of one preferred embodiment thereof Many other variations are possible.

The electro-chemical-thermal cell represents a unique combination of electrical and thermal systems. The combination provides 10 fold increases in both power and energy densities relative to the best electrical battery system. This makes this cell ideal as an energy storage and delivery system for vehicles.

The individual elements in the patent can be used as a whole unit or as sub-assemblies on new or existing battery designs.

Accordingly, the scope of the invention should be determined not by the embodiments illustrated, but by the appended claims and their legal equivalents.

What is claimed is:

1. A rechargeable energy storage cell comprising:

a container holding chemical reactants and reactant product; and at least one electrode in operational communication with the reactant product, the reactant product being electrolyzed into the chemical reactants when the at least one electrode is electrically activated, a portion of the electrode functioning as a valve to convey one of the chemical reactants without conveying the reactant product.

2. The cell of claim 1, further comprising electrical connections in electrical communication with the at least one electrode, and a thermal output region connected to the container wherein thermal energy is output from the cell when the reactants are combined.

3. The cell of claim 1, wherein one of the reactants is an oxidizer, another of the reactants is a metal in liquid form, and the reactant product is at least one salt.

4. The cell of claim 3, wherein the oxidizer is stored in iodine.

5. The cell of claim 1, wherein the electrode has an internal cavity and the chemical reactant conveyed by the portion of the electrode functioning as a valve is conveyed into the cavity.

6. The cell of claim 1, wherein the portion of the electrode functioning as a valve has a porous surface and wall area with a pressure differential thereacross, whereby the chemical reactant conveyed by the portion of the electrode functioning as a valve is conveyed through the porous wall.

7. A rechargeable energy storage cell comprising:

chemical reactants;

reactant product;

a container holding the chemical reactants and reactant product, the container having a reaction portion wherein the chemical reactants are controllably combined to produce heat and the reactant product, the reaction portion being constructed and arranged to transfer heat as an output of the storage cell; and at least one electrode in operational communication with the reactant product, the reactant product being electrolyzed into the chemical reactants when the at least one electrode is electrically activated, the electrode having an internal cavity, a portion of the electrode functioning as a valve to convey one of the chemical reactants into the cavity without conveying the reactant product into the cavity.

8. The cell of claim 7, wherein one of the reactants is an oxidizer, another of the reactants is a metal in liquid form, and the reactant product is at least one salt, and wherein the container is constructed and arranged to provide for separation of the oxidizer, the metal and the at least one salt.

9. The cell of claim 8, wherein the at least one salt is disposed in a salt region, the metal is disposed in a metal region, the salt region and the metal region being adjacent, and in fluid communication with each other.

10. The cell of claim 7, wherein the reaction portion protrudes from the container.

11. The cell of claim 7, further comprising a wick for conveying one of the reactants into the reaction portion.

12. The cell of claim 7, further comprising an input line in fluid communication with the reaction portion, the input line controllably conveying a reactant into the reaction portion.

13. The cell of claim 12, further comprising a valve in fluid communication with the input line, the valve regulating flow of the reactant in the input line.

14. A rechargeable energy storage cell comprising in combination;

a container for storing a reactant product and one of the reactants thereof in separate regions, a valve electrode in said container for separating said reactant product into its chemical reactants by electrolysis, said valve electrode having one surface permitting free separation and escape of said one reactant to the associated region of said container and a second surface for channeling the second reactant to an isolated storage tank, a thermal reactant chamber in communication with said container, wicking means for moving said one reactant from said container to said reaction chamber, and selectively operable valve and conduit means for moving said second reactant from said storage tank to said reaction chamber, the combining of said reactants releasing thermal energy as the sole output of said cell to complete the discharge cycle.

15. An electrically rechargeable storage cell for storing energy in chemical form for discharge as thermal energy output comprising;

a main container for storing a reactant product and a quantity of one reactant thereof in separate regions, at least one valve electrode mounted in said container for electrolyzing the reactant product into chemical reactants to complete a charging cycle, a control valve in said container for metering the supply of reactant product delivered to said valve electrode responsive to the reduction of reactant product by electrolysis, said valve electrode allowing free separation of said one reactant from one surface thereof into the associated region of said container and being constructed and arranged to channel the second reactant from a second surface thereof to a storage tank chemically isolated from said main container, a reaction chamber having a restricted passageway communicating with said main container, selectively operable valve and conduit means for establishing a flow of said second reactant from said storage tank to the reaction chamber, and a reactant wick located in said reaction chamber and extending into said main container so as to be exposed to the quantity of said first reactant, whereby combining said reactants releases thermal energy within said reaction chamber as the sole output of said cell and reactant product is permitted to flow from said reaction chamber to the associated region of said container to complete the discharge cycle.

16. The cell of claim 15 wherein the reactant product is at least one salt;

said valve electrode has an internal cavity and a portion of the electrode functions to convey the second reactant electrolyzed by the electrode into the cavity without conveying the at least one salt into the cavity.

17. The cell of claim 16 wherein;

said one reactant is a metal in liquid form, and said second reactant is an oxidizer.

18. The cell of claim 17 wherein said oxidizer is stored in iodine.

19. The cell of claim 15 including a plurality of said valve electrodes arranged in series.

* * * * *